United States Patent
Kobayashi et al.

(10) Patent No.: US 12,534,099 B2
(45) Date of Patent: Jan. 27, 2026

(54) DRIVING ASSISTANCE SYSTEM, DRIVING ASSISTANCE METHOD, AND NON-TRANSITORY STORAGE MEDIUM

(71) Applicant: TOYOTA JIDOSHA KABUSHIKI KAISHA, Toyota (JP)

(72) Inventors: Hideki Kobayashi, Miyoshi (JP); Yasuhiro Miura, Owariasahi (JP); Motohiro Kojima, Okazaki (JP); Kuka Ishiyama, Musashino (JP); Tadahiro Nishikawa, Nisshin (JP); Koji Aikawa, Nagoya (JP); Yuji Ota, Kariya (JP); Yasuhiro Ishiguro, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 153 days.

(21) Appl. No.: 18/411,417

(22) Filed: Jan. 12, 2024

(65) Prior Publication Data
US 2024/0294181 A1 Sep. 5, 2024

(30) Foreign Application Priority Data
Mar. 3, 2023 (JP) ................. 2023-032805

(51) Int. Cl.
*B60W 50/14* (2020.01)
*B60K 35/28* (2024.01)

(52) U.S. Cl.
CPC ............ *B60W 50/14* (2013.01); *B60K 35/28* (2024.01); *B60W 2050/146* (2013.01); *B60W 2556/10* (2020.02)

(58) Field of Classification Search
CPC .......... B60W 50/14; B60W 2050/146; B60W 2556/10; B60K 35/28
See application file for complete search history.

(56) References Cited

U.S. PATENT DOCUMENTS

| 10,056,008 | B1 * | 8/2018 | Sweany | ............... G09B 19/167 |
| 2011/0063099 | A1 * | 3/2011 | Miller | ............... G09B 19/16 340/439 |
| 2019/0107841 | A1 | 4/2019 | Sasajima | |
| 2023/0303109 | A1 * | 9/2023 | Nakada | ............... B60W 50/14 |

FOREIGN PATENT DOCUMENTS

JP 2019-070959 A 5/2019

* cited by examiner

*Primary Examiner* — Omeed Alizada
(74) *Attorney, Agent, or Firm* — Finnegan, Henderson, Farabow, Garrett and Dunner, LLP

(57) ABSTRACT

A driving assistance system includes a memory and a processor coupled to the memory. Based on use history data of a driving assistance function including positions at which the driving assistance function has been used at respective vehicles, which is collected from plural vehicles and stored in the memory, and based on position information indicating planned travel positions at which a specific vehicle is going to travel, the processor aggregates use frequencies of the driving assistance function at the planned travel positions of the plural vehicles, and, based on the aggregated use frequencies, the processor outputs information that suggests use of the driving assistance function at the specific vehicle.

3 Claims, 7 Drawing Sheets

DRIVING ASSISTANCE SYSTEM, DRIVING ASSISTANCE METHOD, AND NON-TRANSITORY STORAGE MEDIUM

CROSS-REFERENCE TO RELATED APPLICATION

This application is based on and claims priority under 35 USC 119 from Japanese Patent Application No. 2023-032805 filed on Mar. 3, 2023, the disclosure of which is incorporated by reference herein.

BACKGROUND

Technical Field

The present disclosure relates to a driving assistance system, a driving assistance method, and a non-transitory storage medium.

Related Art

For example, technology disclosed in Japanese Patent Application Laid-Open (JP-A) No. 2019-070959 detects an assistance point candidate at which driving assistance for an own-vehicle is required, within a travel area of the own-vehicle, and, in a case in which the detected assistance point candidate satisfies a registration condition, registers the assistance point candidate as an assistance point and performs driving assistance for the own-vehicle at the registered assistance point.

Further, in a case in which the assistance point candidate belongs to a second action region in which an action frequency of the own-vehicle is estimated to be relatively low, this technology relaxes the registration condition, as compared to a case in which the assistance point candidate belongs to a first action region in which an action frequency of the own-vehicle is estimated to be relatively high.

Incidentally, among users of a vehicle installed with a driving assistance function, there are users who are not able to effectively utilize the driving assistance function. Accordingly, in order to promote use of the driving assistance function and improve convenience of a user, it is conceivable to suggest use of the driving assistance function to the user. However, roads in an environment suitable for use of the driving assistance function and other roads are mixed together among roads on which the vehicle travels, and therefore, it is not preferable to indiscriminately suggest use of the driving assistance function.

SUMMARY

The present disclosure provides a driving assistance system, a driving assistance method, and a non-transitory storage medium capable of suggesting use of a driving assistance function when travelling at a position suitable for use of the driving assistance function.

A driving assistance system according to a first aspect includes a computation section that, based on use history data of a driving assistance function including positions at which the driving assistance function has been used at respective vehicles, which is collected from plural vehicles and stored in a storage section, and based on position information indicating planned travel positions at which a specific vehicle is going to travel, aggregates use frequencies of the driving assistance function at the planned travel positions of the plural vehicles, and an output section that, based on the use frequencies that have been aggregated by the computation section, outputs information that suggests use of the driving assistance function at the specific vehicle.

In the first aspect, based on the use history data of the driving assistance function that has been collected from the plural vehicles, the use frequencies of the driving assistance function at the planned travel positions of the specific vehicle are aggregated, and based on the aggregated use frequencies, information that suggests use of the driving assistance function is output at the specific vehicle. Consequently, use of the driving assistance function can be suggested when travelling at a position at which the use frequency of the driving assistance function is high, namely, at a position suitable for use of the driving assistance function, and convenience of a user of a vehicle installed with the driving assistance function can be improved.

A second aspect is the first aspect, wherein the output section also outputs the use frequencies that have been aggregated by the computation section.

In the second aspect, when information that suggests use of the driving assistance function is output, a use frequency of the driving assistance function at the planned travel position for the plural vehicles is also output. Consequently, a user attempting to use the driving assistance function can be imparted with a feeling of security, based on the output use frequency of the driving assistance function at the planned travel position for the plural vehicles.

A third aspect is the first aspect, wherein the output section outputs information that suggests use of the driving assistance function at the specific vehicle in a case in which a use frequency that has been aggregated by the computation section is higher than a threshold.

In the third aspect, use of the driving assistance function can be suggested when travelling at a position at which the use frequency of the driving assistance function is higher than the threshold, namely, at a position suitable for use of the driving assistance function, and convenience of the user of the vehicle installed with the driving assistance function can be improved.

A fourth aspect is the first aspect, wherein the computation section aggregates the use frequencies of the driving assistance function at the planned travel positions for each of the specific vehicle and other vehicles among the plurality of vehicles which are not the specific vehicle, and the output section outputs information that suggests use of the driving assistance function at the specific vehicle in a case in which a use frequency that has been aggregated for the other vehicles by the computation section is higher than a use frequency that has been aggregated for the specific vehicle by the computation section.

In the fourth aspect, in a case in which the use frequency of the driving assistance function of the other vehicles among the plurality of vehicles which are not the specific vehicle at the planned travel position is higher than the use frequency of the driving assistance function of the specific vehicle at the planned travel position, information that suggests use of the driving assistance function is output. Consequently, wasteful output of information suggesting use of the driving assistance function can be suppressed at planned travel positions at which the driving assistance function is already being used at a high frequency at the specific vehicle.

The present disclosure has an advantageous effect in that use of a driving assistance function can be suggested when travelling at a position suitable for use of the driving assistance function.

BRIEF DESCRIPTION OF THE DRAWINGS

Exemplary embodiments of the present invention will be described in detail based on the following figures, wherein.

DETAILED DESCRIPTION

Figure 1:
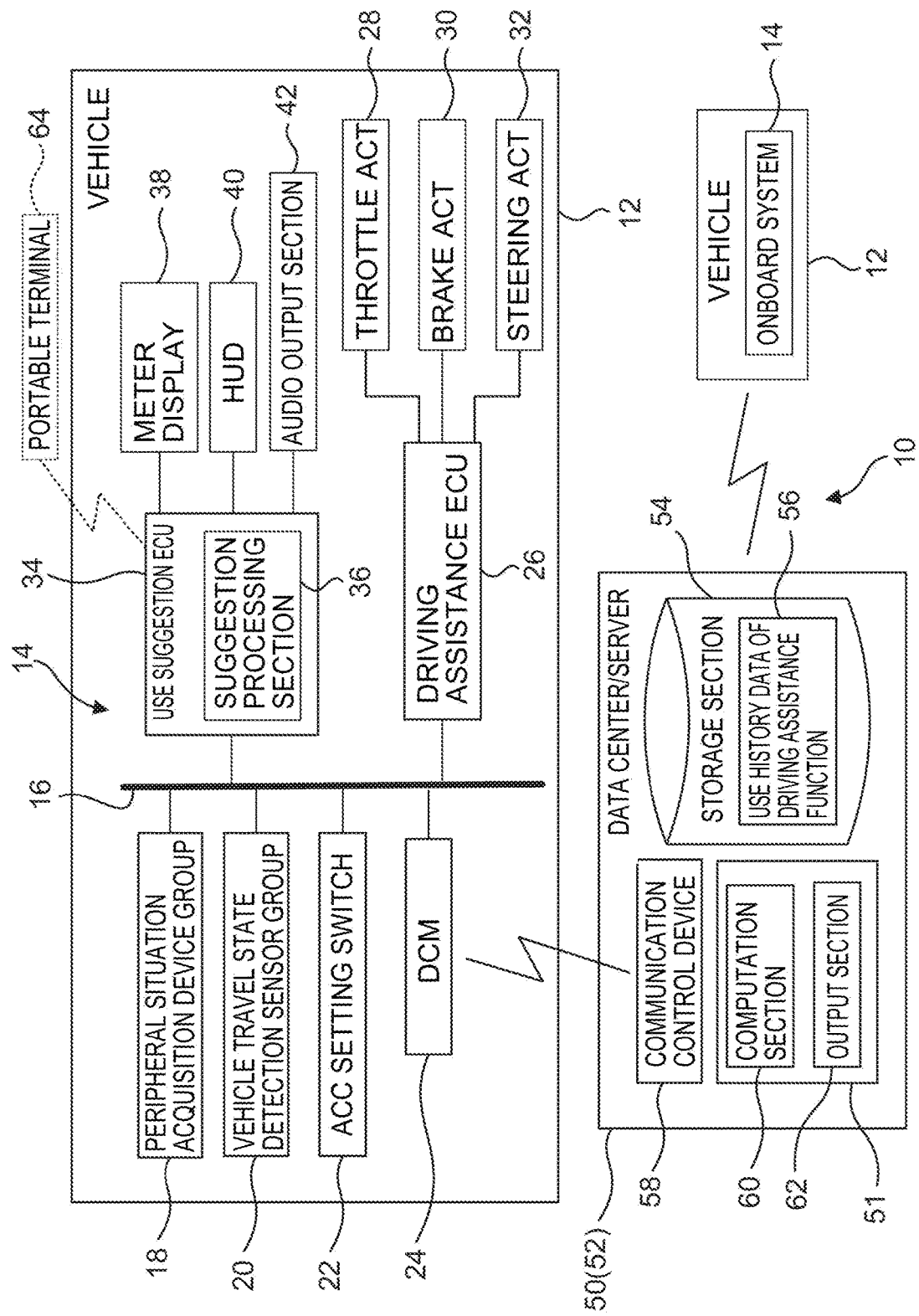
FIG. 1 is a block diagram illustrating a schematic configuration of a driving assistance system.

Below, an example of an exemplary embodiment of the present disclosure will be explained in detail with reference to the drawings. FIG. 1 illustrates a driving assistance system 10 according to the exemplary embodiment. The driving assistance system 10 includes onboard systems 14 that are respectively installed at plural vehicles 12, and a server 52 that is provided at a data center 50.

Each onboard system 14 includes a communication bus 16, and a peripheral situation acquisition device group 18, a vehicle travel state detection sensor group 20, an adaptive cruise control (ACC) setting switch 22, a data communication module (DCM) 24, a driving assistance electronic control unit (ECU) 26, and a use suggestion ECU 34 are respectively connected to the communication bus 16. It should be noted that FIG. 1 illustrates only a portion of the onboard system 14.

The peripheral situation acquisition device group 18 includes, as devices that acquire information indicating what kind of situation a surrounding environment of the vehicle 12 is in, a global navigation satellite system (GNSS) device, a navigation system, a radar device, a camera, and the like. The GNSS device receives GNSS signals from plural GNSS satellites to determine a position of the vehicle 12. The navigation system performs processing to display the position of the vehicle 12 on a map, provide guidance along a planned travel route to a destination, and the like, based on position information that has been obtained from the GNSS device and map information stored in advance in a storage section. The radar device detects an object, such as a pedestrian, another vehicle or the like, that is present in the surroundings of the vehicle 12, and detects a relative position and a relative speed between the detected object and the vehicle 12. The camera captures an image of the surroundings of the vehicle 12, and outputs the captured image.

Further, the vehicle travel state detection sensor group 20 includes, as plural sensors that acquire a travel state of the vehicle 12, a steering angle sensor that detects a steering angle of the vehicle 12, a vehicle speed sensor that detects a travel speed of the vehicle 12, and an acceleration sensor that detects acceleration applied to the vehicle 12. The ACC setting switch 22 is a switch that is capable of setting at least on/off switching of ACC. The DCM 24 performs wireless communication with a server 52 or the like.

The driving assistance ECU 26 is connected to a throttle ACT 28 that changes a throttle opening degree of the vehicle 12, a brake ACT 30 that changes a braking force generated by a braking device of the vehicle 12, and a steering ACT 32 that changes a steering amount by a steering device of the vehicle 12.

The driving assistance ECU 26 includes a central processing unit (CPU), memory such as a read only memory (ROM), a random access memory (RAM), or the like, a non-volatile storage section such as a hard disk drive (HDD), a solid state drive (SSD), or the like, and a communication interface (I/F). Driving assistance software is stored in the storage section, and the driving assistance ECU 26 performs driving assistance processing to cause the vehicle 12 to travel automatically without accompanying driving operation by an occupant of the vehicle 12, due to the CPU executing the driving assistance software. An example of the driving assistance processing performed by the driving assistance ECU 26 is ACC.

Namely, in a case in which the ACC has been turned on via the ACC setting switch 22, the driving assistance ECU 26 controls travelling of the vehicle 12 so that a detection value of an inter-vehicle distance or an inter-vehicle time with respect to another vehicle (a preceding vehicle serving as a following target) that is traveling ahead in a progression direction of the vehicle 12 corresponds to a preset designated value of the inter-vehicle distance or the inter-vehicle time. More specifically, based on information obtained from the peripheral situation acquisition device group 18 and the vehicle travel state detection sensor group 20, the throttle ACT 28, the brake ACT 30, and the steering ACT 32 are controlled so that the detection value of the inter-vehicle distance or the inter-vehicle time with respect to the preceding vehicle serving as the following target corresponds to the preset designated value of the inter-vehicle distance or the inter-vehicle time, to thereby perform ACC to control travelling of the vehicle 12 so as to follow the preceding vehicle serving as the following target.

The use suggestion ECU 34 is connected to a meter display 38, a head-up display (hereafter referred to as a HUD) 40, and an audio output section 42. The meter display 38 is a display that is provided at an instrument panel of the vehicle 12. Further, the HUD 40 is a compact HUD that uses a portion of a forward field of view of an occupant of the vehicle 12 as a display range (forms an image downwardly within a foreground) by reflection or the like toward a windshield glass. Furthermore, the audio output section 42 includes an amplifier and a speaker for outputting audio.

The use suggestion ECU 34 includes a CPU, memory such as a ROM, a RAM or the like, a non-volatile storage section such as an HDD, an SSD or the like, and a communication I/F, and a suggestion processing program is stored in the storage section (not illustrated in the drawings). Due to the suggestion processing program being read out from the storage section and expanded in the memory, and the suggestion processing program that has been expanded in memory being executed by the CPU, the use suggestion ECU 34 functions as a suggestion processing section 36 and performs suggestion processing 1 (FIG. 3), which will be described later.

The suggestion processing section 36 acquires information regarding the planned travel route that the vehicle 12 is going to travel along going forward, from the navigation system, and transmits the information to the server 52. Further, the suggestion processing section 36 selectively outputs information suggesting use of the driving assistance function using the meter display 38 or the like based on instruction information that has been transmitted from the server 52 due to suggestion processing 2 (refer to FIG. 3) being executed at the server 52. Furthermore, in a case in which a driving assistance function such as the ACC has been used by a user at the vehicle 12, the suggestion processing section 36 transmits use history data including information regarding an ID of the vehicle 12, the driving assistance function that has been used, a use period, and a use area, to the server 52.

Figure 2:
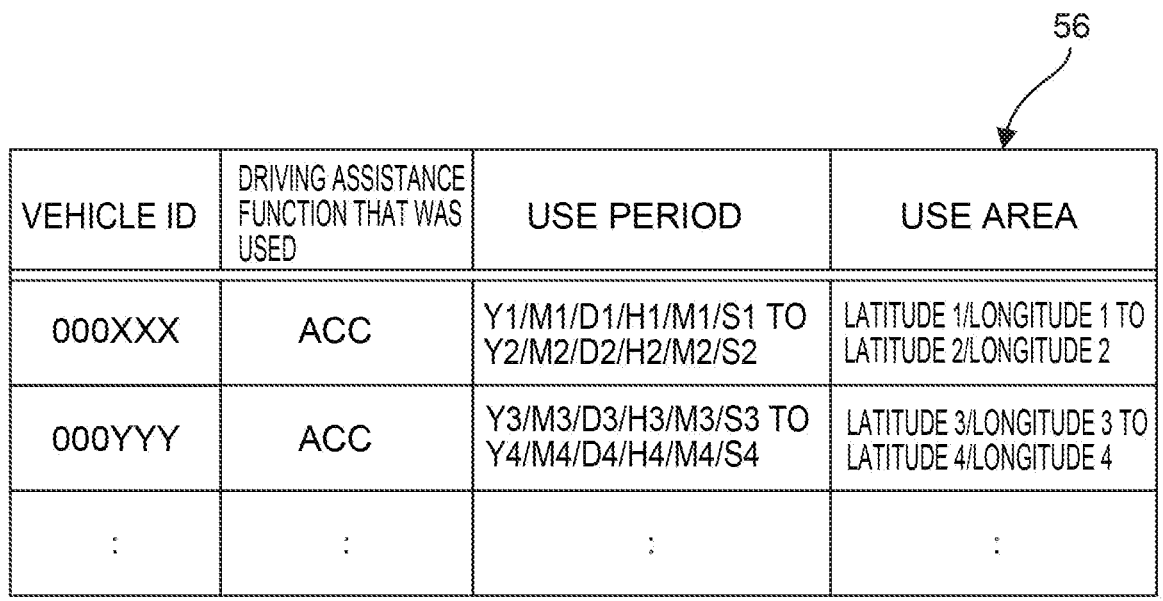
FIG. 2 is a table illustrating an example of use history data of a driving assistance function.
Figure 7:
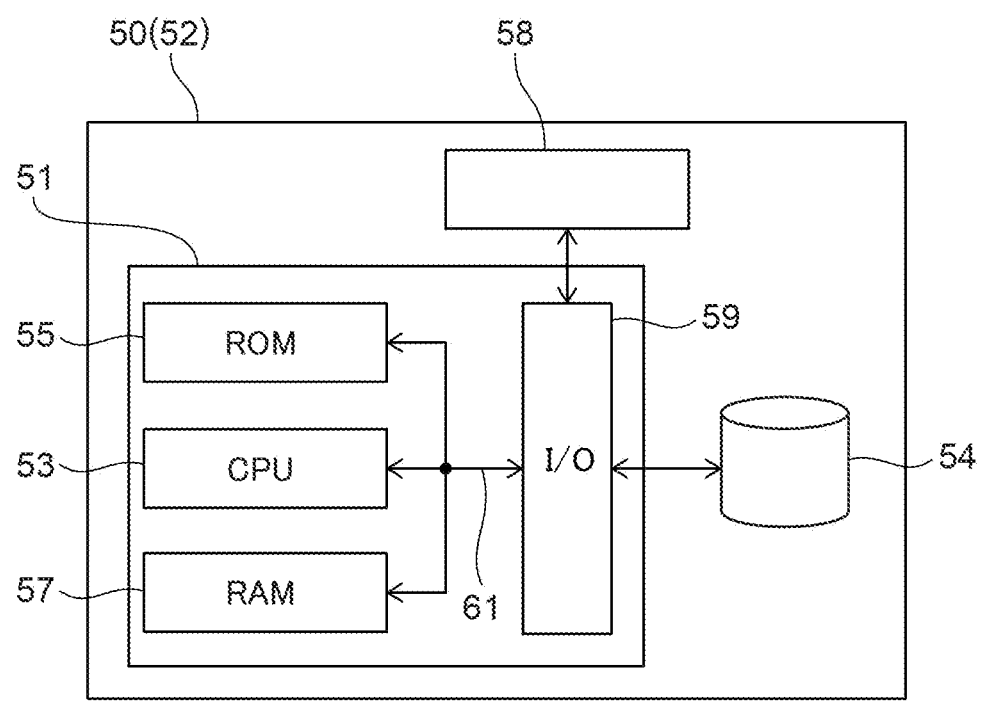
FIG. 7 is a block diagram illustrating a hardware configuration of a data center/server.

As illustrated in FIG. 7, the server 52 includes a server ECU 51 in which a CPU 53, a ROM 55, a RAM 57, and an input/output interface (I/O) 59 are connected to a bus 61, a non-volatile storage section 54 such as an HDD, an SSD or the like, and a communication control device 58. The storage section 54 of the server 52 is provided with a storage region for use history data 56 of the driving assistance function. Every time use history data is received from any of the plural vehicles 12, the server 52 additionally registers the received data in the storage region for the use history data 56 of the driving assistance function that is provided at the storage section 54 (also refer to FIG. 2).

Further, a computation/output program (not illustrated in the drawings) is stored in the storage section 54 of the server 52. Due to the computation/output program, which has been stored in the ROM 55 serving as a memory or the storage section 54 serving as a memory, being expanded in the RAM 57 and executed by the CPU 53 serving as a processor, the server 52 functions as a computation section 60 and an output section 62 and performs the suggestion processing 2 (FIG. 3), which will be described later.

The computation section 60 aggregates use frequencies of the driving assistance function such as ACC at planned travel positions of the plural vehicles 12, based on the use history data 56 of the driving assistance function including positions at which the driving assistance function such as ACC has been used at the respective vehicles, which has been collected from the plural vehicles 12 and stored in the storage section 54, and based on position information indicating planned travel positions at which vehicles 12 that have transmitted a planned travel route are going to travel. The output section 62 outputs information suggesting use of the driving assistance function such as ACC at the vehicles 12 that have transmitted a planned travel route, based on the use frequencies of the driving assistance function at the planned travel positions for the plural vehicles 12, which have been aggregated by the computation section 60.

Figure 3:
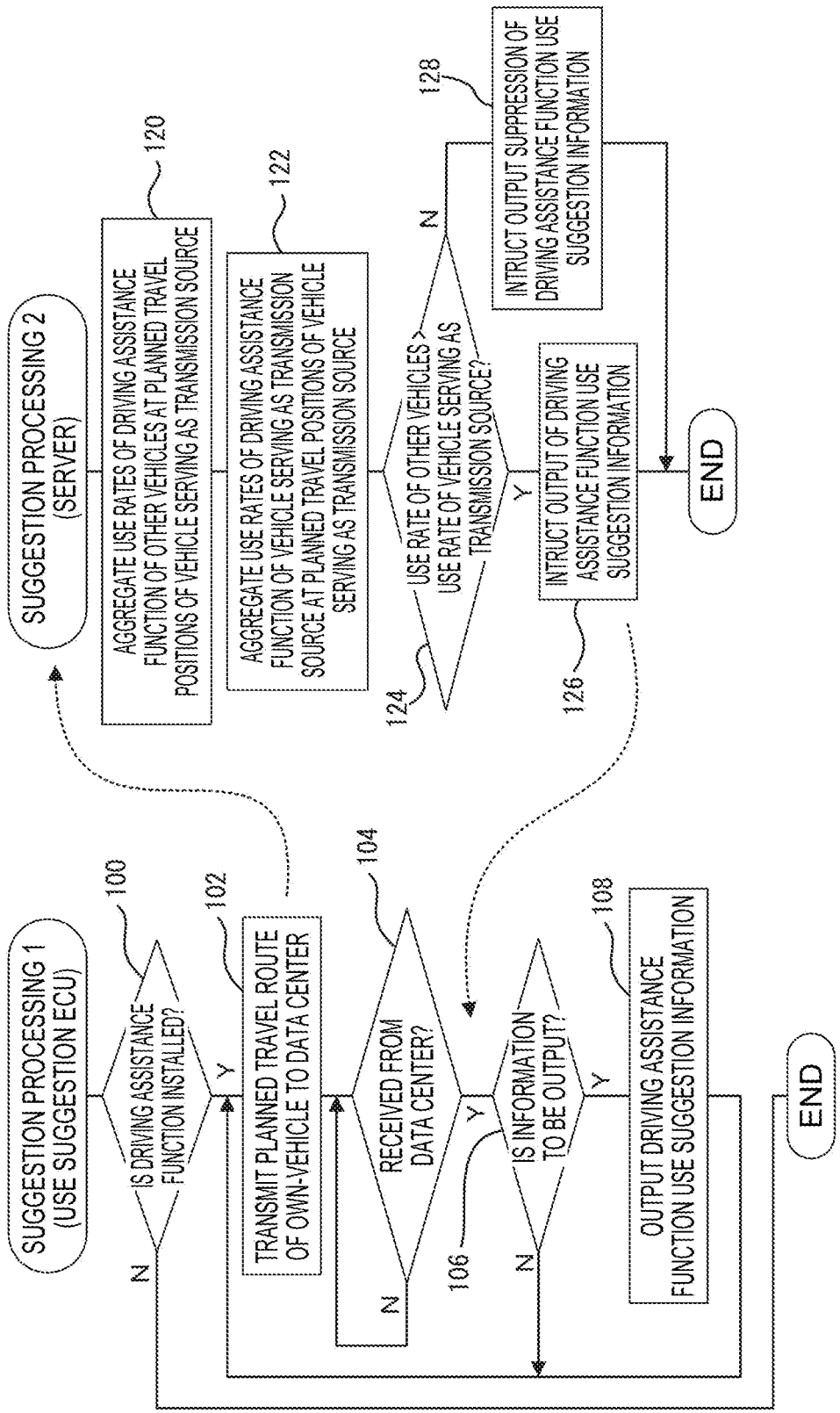
FIG. 3 is a flowchart illustrating an example of suggestion processing.

Next, as operation of the present exemplary embodiment, suggestion processing 1 that is executed by the suggestion processing section 36 of the use suggestion ECU 34 will first be explained, with reference to FIG. 3. It should be noted that the suggestion processing 1 is executed by the use suggestion ECU 34 of the vehicle 12 while an ignition switch of the vehicle 12 is on.

At step 100 of the suggestion processing 1, the suggestion processing section 36 determines whether or not a driving assistance function is installed at the vehicle 12 (own-vehicle). For example, in a case in which the driving assistance ECU 26 is not installed at the own-vehicle, the determination of step 100 is negative, and the suggestion processing 1 is ended. Further, in a case in which the determination of step 100 is affirmative, the processing transitions to step 102. At step 102, the suggestion processing section 36 acquires, from the navigation system, information relating to a planned travel route that the vehicle 12 (own-vehicle) is going to travel along going forward, and transmits the acquired planned travel route information to the server 52. It should be noted that the planned travel route information is an example of position information of the present disclosure.

At the next step 104, the suggestion processing section 36 determines whether or not instruction information has been received from the server 52. In a case in which the determination of step 104 is negative, step 104 is repeated until instruction information is received from the server 52. While step 104 of the suggestion processing 1 is being repeated in this manner, the suggestion processing 2 is executed at the server 52, using reception of the planned travel route information from the vehicle 12 as a trigger.

At step 120 of the suggestion processing 2, first, the computation section 60 of the server 52 identifies, from the planned travel route information that has been received from the vehicle 12, planned travel positions at which the vehicle 12 serving as a transmission source of the planned travel route information is going to travel going forward (for example, latitude and longitude of each of plural points (planned travel positions) respectively positioned at intervals on the planned travel route). It should be noted that, in the present exemplary embodiment, the vehicle 12 serving as the transmission source is an example of a specific vehicle of the present disclosure.

Figure 4:
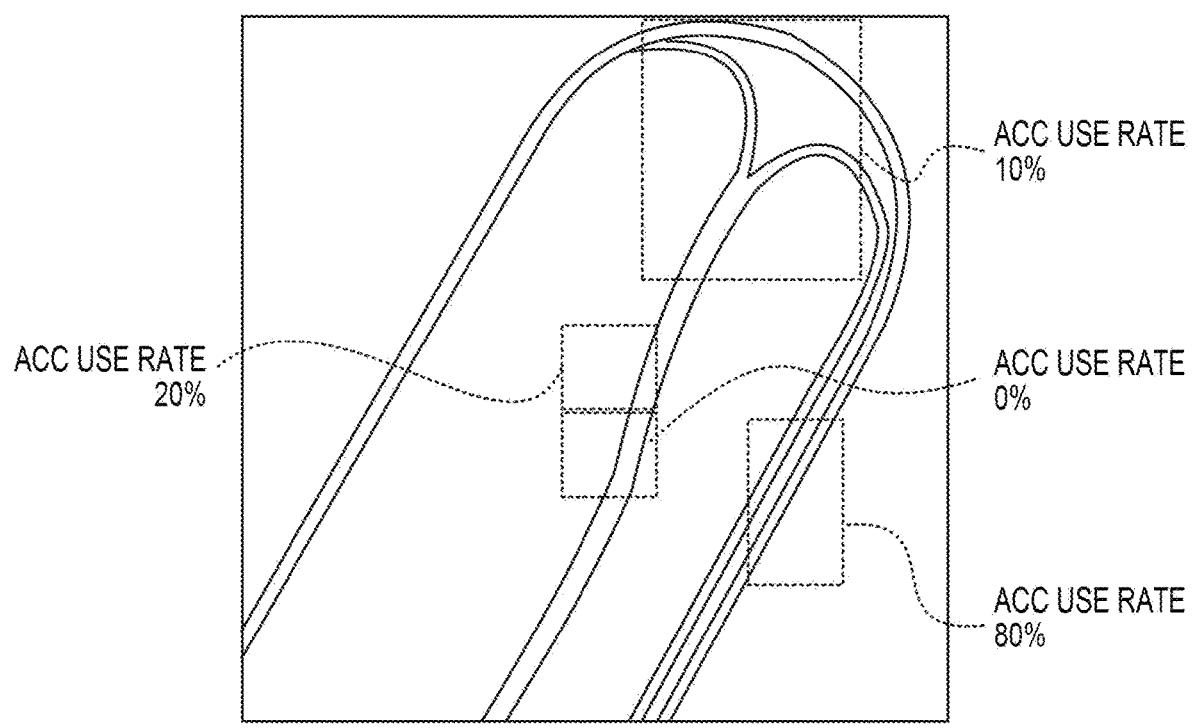
FIG. 4 is a conceptual diagram illustrating an example of a distribution of ACC use rates obtained from the use history data of the driving assistance function.

Next, the computation section 60 extracts, from the use history data 56 of the driving assistance function stored in the storage section 54, use history data representing the use history of the driving assistance function for other vehicles among the plurality of vehicles which are not the vehicle 12 serving as the transmission source at the plural planned travel positions of the vehicle 12 serving as the transmission source. Then, based on the extracted use history data, the computation section 60 divides numbers of uses of the driving assistance function of the other vehicles at the individual planned travel positions by transit amounts of the vehicles 12 at the corresponding individual planned travel positions, to thereby aggregate the use rates of the driving assistance function at the other vehicles for each of the individual planned travel positions. It should be noted that the transit amounts of the vehicles 12 at the individual planned travel positions can be acquired from, for example, a transit amount sensor installed at a roadside. By way of example, as illustrated in FIG. 4, due to the processing of step 120 described above, information representing how regions, in which the use rates (ACC use rates) of the driving assistance function by the other vehicles are different, are distributed on the planned travel route of the vehicle 12 serving as the transmission source is obtained.

At the next step 122, the computation section 60 extracts, from the use history data 56 of the driving assistance function stored in the storage section 54, use history data representing the use history of the driving assistance function for the vehicle 12 serving as the transmission source at the plural planned travel positions of the vehicle 12 serving as the transmission source. Then, based on the extracted use history data, the computation section 60 divides the numbers of uses of the driving assistance function of the vehicle 12 serving as the transmission source at the individual planned travel positions by the transit numbers of the vehicle 12 serving as the transmission source at the corresponding individual planned travel positions, to thereby aggregate the use rates of the driving assistance function at the vehicle 12 serving as the transmission source for each of the individual planned travel positions.

At step 124, the output section 62 of the server 52 determines whether or not there are any planned travel positions for which the use rate of the driving assistance function by the other vehicles among the plurality of vehicles which are not the vehicle 12 serving as the transmission source is higher than the use rate of the driving assistance function by the vehicle 12 serving as the transmission source, among the plural planned travel positions. In a case in which the determination of step 124 is affirmative, the processing transitions to step 126, and at step 126, the output section 62 transmits, to the vehicle 12 serving as the transmission source, instruction information instructing output of driving assistance function use suggestion information at the planned travel position, and ends the suggestion processing 2. It should be noted that, in the present exemplary embodiment, information indicating the planned travel position (for example, latitude and longitude of the planned travel position) at which the use rate of the driving assistance function by the other vehicles is higher than the use rate of the driving assistance function by the vehicle 12 serving as the transmission source, and information indicating the use rate of the driving assistance function for the other vehicles at the planned travel position, are appended to the instruction information that is transmitted from the output section 62 to the vehicle 12 serving as the transmission source at step 126.

On the other hand, in a case in which the determination of step 124 is negative, the processing transitions to step 128, and at step 128, the output section 62 transmits, to the vehicle 12 serving as the transmission source, instruction information instructing output suppression of the driving assistance function use suggestion information at the planned travel position, and ends the suggestion processing 2.

When the instruction information that has been transmitted from the server 52 as described above is received at the use suggestion ECU 34, the determination of step 104 is affirmative, and the processing transitions to step 106. At step 106, based on the received instruction information, the suggestion processing section 36 determines whether or not output of the driving assistance function use suggestion information has been instructed from the server 52, and in a case in which the determination of step 106 is affirmative, the processing transitions to step 108. At step 108, in a case in which the position of the own-vehicle has approached the planned travel position at which the use rate of the driving assistance function is higher for the other vehicles than for the own-vehicle, the suggestion processing section 36 outputs driving assistance function use suggestion information such as, for example, that which is illustrated in FIG. 5, and returns to step 102.

Figure 5:
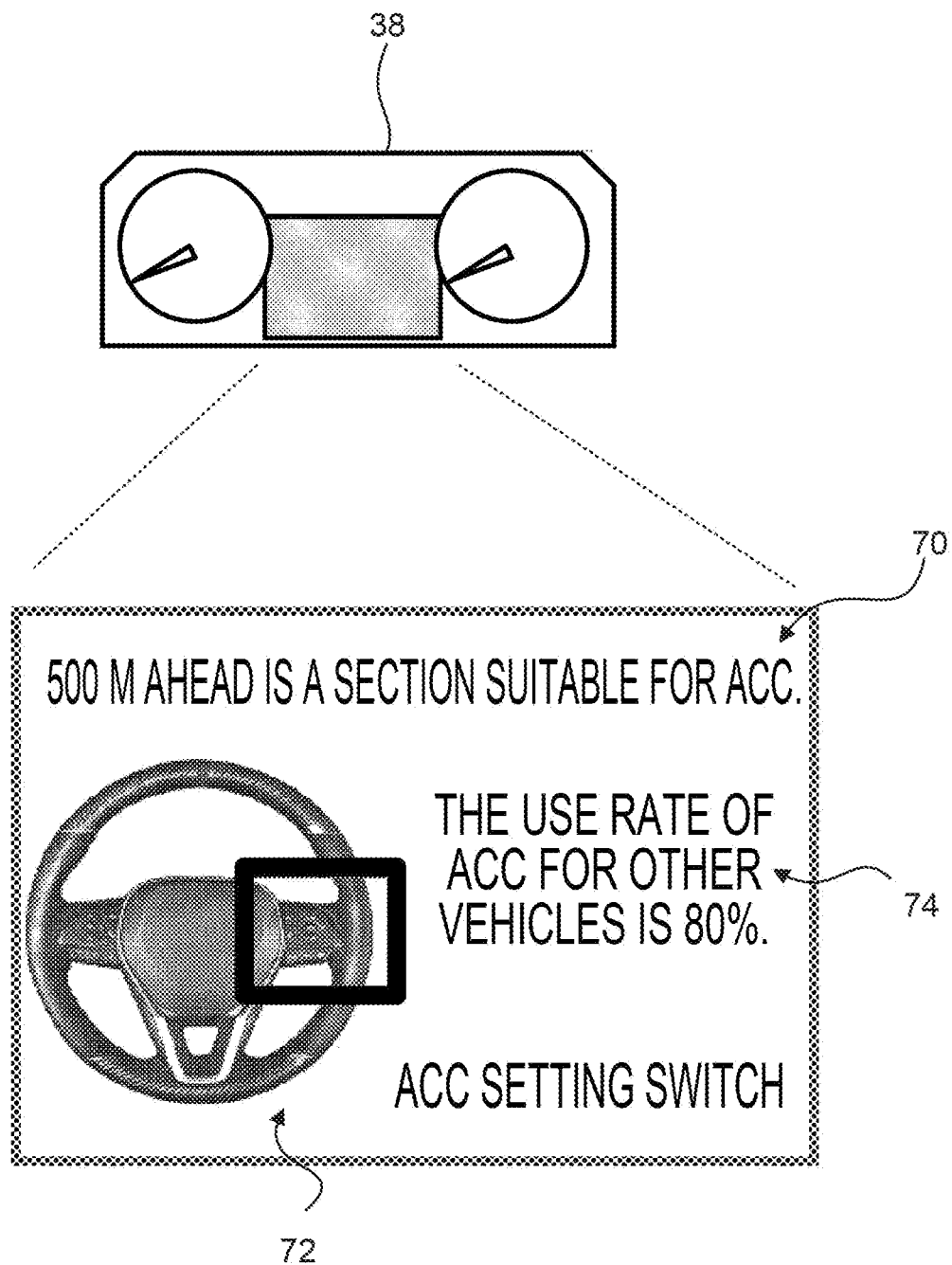
FIG. 5 is a conceptual diagram illustrating an example of driving assistance function use suggestion information.

In the example illustrated in FIG. 5, an aspect is illustrated in which a message 70 that states "500 m ahead is a section suitable for ACC" and an illustration 72 that provides guidance for a location of the ACC setting switch 22 are displayed at the meter display 38 as driving assistance function use suggestion information. Further, in the example illustrated in FIG. 5, a message 74 that states "The use rate of ACC for other vehicles is 80%" is also displayed to thereby also notify the user of the use rate of the driving assistance function for the other vehicles. In a case in which the user of the vehicle accepts the use of the driving assistance function that has been suggested by the output information, the user uses the driving assistance function (ACC) by performing an operation to switch the ACC on via the ACC setting switch 22.

It should be noted that the driving assistance function use suggestion information illustrated as an example in FIG. 5 may be displayed at the HUD instead of the meter display 38, or may be output by audio from the audio output section 42. Further, in a case in which the use suggestion ECU 34 functioning as the suggestion processing section 36 is capable of wireless communication with a portable terminal 64 (illustrated by dashed lines in FIG. 1) that is possessed by a user (who may be either of a driver or a passenger) onboard the vehicle 12 serving as the transmission source (specific vehicle 12), the suggestion processing section 36 may control the portable terminal 64 such that the driving assistance function use suggestion information is output at the portable terminal 64. It should be noted that, in a case in which the determination of step 106 is negative, the processing returns to step 102 without performing processing such as output of the driving assistance function use suggestion information or the like.

As described above, in the above-described exemplary embodiment, based on the use history data 56 of the driving assistance function including the positions at which the driving assistance function has been used at the respective vehicles 12, which has been collected from the plural vehicles 12 and stored in the storage section 54, and on the position information indicating the planned travel positions at which the specific vehicle is going to travel, the computation section 60 aggregates the use frequencies of the driving assistance function at the planned travel positions of the plural vehicles 12. The output section 62 then outputs information suggesting use of the driving assistance function at the specific vehicle based on the use frequencies that have been aggregated by the computation section 60. Consequently, use of the driving assistance function can be suggested when traveling at a position at which the use frequency of the driving assistance function is high, namely, at a position that is suitable for use of the driving assistance function, and convenience of the user of the vehicle installed with the driving assistance function can be improved.

Further, in the above-described exemplary embodiment, the output section 62 also outputs the use frequencies that have been aggregated by the computation section 60. Consequently, a user attempting to use the driving assistance function can be imparted with a feeling of security, based on the output use frequencies of the driving assistance function at the planned travel positions for the plural vehicles.

Furthermore, in the above-described exemplary embodiment, the computation section 60 aggregates the use frequencies of the driving assistance function at the planned travel positions for each of the specific vehicle and the other vehicles among the plurality of vehicles which are not the specific vehicle. Then, in a case in which the use frequency that has been aggregated by the computation section 60 for the other vehicles is higher than the use frequency that has been aggregated by the computation section 60 for the specific vehicle, the output section 62 outputs information suggesting use of the driving assistance function at the specific vehicle. Consequently, wasteful output of information suggesting use of the driving assistance function can be suppressed at planned travel positions at which the driving assistance function is already being used at a high frequency at the specific vehicle.

It should be note that, in the above-described exemplary embodiment, explanation has been given regarding an aspect in which it is determined whether or not to output information suggesting use of the driving assistance function by comparing the use frequency of the driving assistance function at a specific vehicle with the use frequency of the driving assistance function at the other vehicles among the plurality of vehicles which are not the specific vehicle. However, the present disclosure is not limited thereto, and, for example, a configuration may be provided in which the use frequency of the driving assistance function at the other vehicles among the plurality of vehicles which are not the specific vehicle is compared with a preset suggestion degree threshold, and, in a case in which the use frequency of the driving assistance function at the other vehicles is higher than the suggestion degree threshold, information suggesting use of the driving assistance function is output at the specific vehicle. In this case as well, use of the driving assistance function can be suggested when travelling at a position at which the use frequency of the driving assistance function is equal to or higher than the suggestion degree threshold, namely, at a position that is suitable for use of the driving assistance function, and convenience of the user of the vehicle installed with the driving assistance function can be improved.

Further, the above-described suggestion degree threshold may be changed according to the willingness or preference of the user onboard the specific vehicle with regard to use of the driving assistance function. As an example, in a case in which the willingness of the user with regard to use of the driving assistance function is low, the suggestion degree threshold may be set to 50%, and, in a case in which the willingness of the user with regard to use of the driving assistance function is high, the suggestion degree threshold may be set to 30%.

Figure 6A:
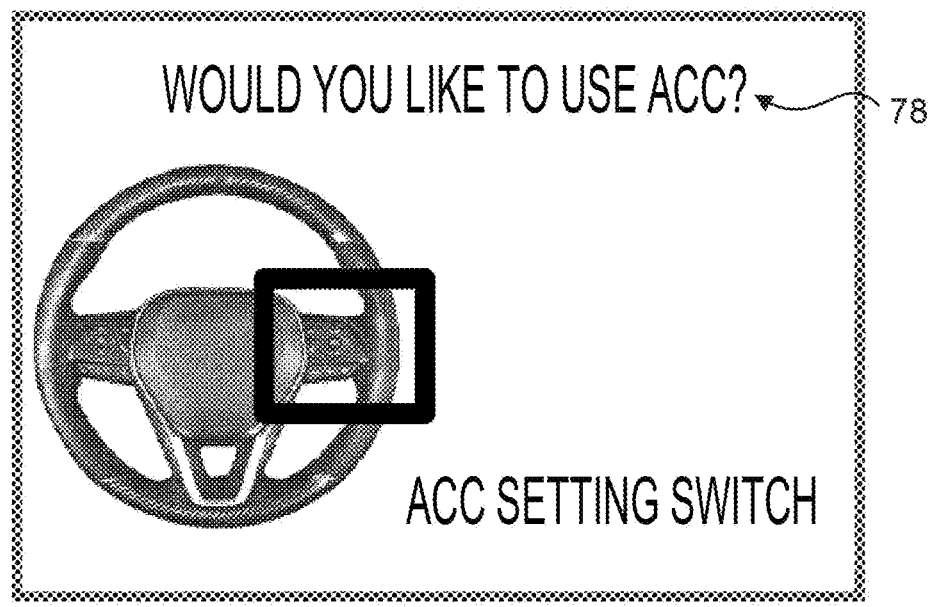
FIG. 6A is a conceptual diagram illustrating another example of driving assistance function use suggestion information.
Figure 6B:
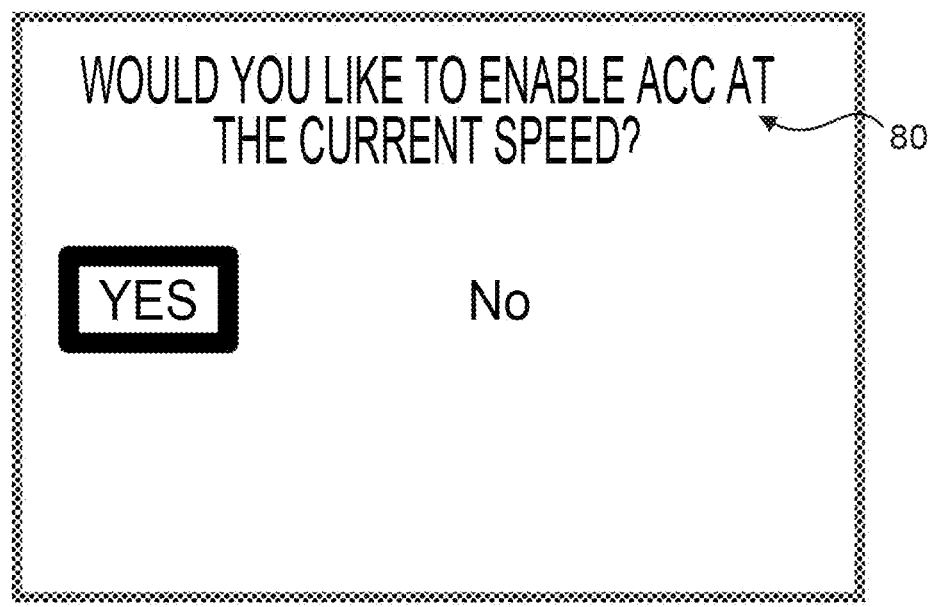
FIG. 6B is a conceptual diagram illustrating another example of driving assistance function use suggestion information.

Further, the driving assistance function use suggestion information is not limited to the message 70 and the illustration 72 illustrated in FIG. 5, and, as an example, a message 78 that asks "Would you like to use ACC?" may be output as the driving assistance function use suggestion information as illustrated in FIG. 6A. Alternatively, as an example, a message 80 that asks "Would you like to enable ACC at the current speed?" may be output as the driving assistance function use suggestion information as illustrated in FIG. 6B. Furthermore, although FIG. 6A and FIG. 6B omit output of the message 74 that provides notification of the use rate of ACC of the other vehicles, the message 74 may also be output therewith.

Moreover, for example, by providing a function such as a challenge mode that scores use of the driving assistance function, it is possible to improve motivation with respect to use of the driving assistance function, for users who intend to use the driving assistance function but whose use frequency of the driving assistance function is low.

Further, although explanation has been given regarding an aspect in which the server 52 of the data center 50 functions as the computation section 60 and the output section 62 of the present disclosure in the above-described exemplary embodiment, the present disclosure is not limited thereto. For example, a configuration may be provided in which the use suggestion ECU 34 at the vehicle 12 side is made to function as at least one of the computation section 60 or the output section 62 of the present disclosure.

Furthermore, although ACC has been explained as an example of the driving assistance function of the present disclosure in the above-described exemplary embodiment, the present disclosure is not limited thereto, and the driving assistance function of the present disclosure may be, for example, lane tracing assistance (LTA), autonomous driving at level 3 to level 5, or the like.

Moreover, although explanation has been given regarding an aspect in which the use rates of the driving assistance function are aggregated as the use frequencies of the driving assistance function in the above-described exemplary embodiment, the present disclosure is not limited thereto, and, for example, a number of uses of the driving assistance function per unit time or the like may be applied.

Although the processing performed by the driving assistance system 10 in the above-described exemplary embodiment has been explained as software processing that is performed by executing programs, there is no limitation thereto. For example, the processing may be processing performed by hardware such as a graphics processing unit (GPU), an application specific integrated circuit (ASIC), a field-programmable gate array (FPGA) or the like. Alternatively, the processing may be processing that is performed by combining both software and hardware. Further, in a case in which the processing is configured as software processing, a configuration may be provided in which the programs are stored and distributed on various non-transitory storage media.

What is claimed is:

1. A driving assistance system comprising:
a memory; and
a processor coupled to the memory,
the processor being configured to:
based on use history data of a driving assistance function, including positions at which the driving assistance function has been used at respective vehicles, which is collected from a plurality of vehicles and stored in the memory, and based on position information indicating planned travel positions at which a specific vehicle is going to travel, aggregate use frequencies of the driving assistance function at the planned travel positions of the plurality of vehicles,
based on the aggregated use frequencies, output information that suggests use of the driving assistance function at the specific vehicle,
aggregate the use frequencies of the driving assistance function at the planned travel positions for each of the specific vehicle and other vehicles among the plurality of vehicles which are not the specific vehicle,
determine, for each of the planned travel positions, whether a use frequency aggregated for the other vehicles is higher than a use frequency aggregated for the specific vehicle, and
in a case in which the use frequency aggregated for the other vehicles is higher than the use frequency aggregated for the specific vehicle, output information that suggests use of the driving assistance function at the specific vehicle along with the aggregated use frequencies, toward a user onboard the vehicle, for each of the planned travel positions in which the use frequency aggregated for the other vehicles is higher than the use frequency aggregated for the specific vehicle.

2. A driving assistance method, comprising, by a processor:
based on use history data of a driving assistance function, including positions at which the driving assistance function has been used at respective vehicles, which is collected from a plurality of vehicles and stored in a memory, and based on position information indicating planned travel positions at which a specific vehicle is going to travel, aggregating use frequencies of the driving assistance function at the planned travel positions of the plurality of vehicles,
based on the aggregated use frequencies, outputting information that suggests use of the driving assistance function at the specific vehicle,
aggregating the use frequencies of the driving assistance function at the planned travel positions for each of the specific vehicle and other vehicles among the plurality of vehicles which are not the specific vehicle, determining, for each of the planned travel positions, whether a use frequency aggregated for the other vehicles is higher than a use frequency aggregated for the specific vehicle, and in a case in which the use frequency aggregated for the other vehicles is higher than the use frequency aggregated for the specific vehicle, outputting information that suggests use of the driving assistance function at the specific vehicle along with the aggregated use frequencies, toward a user onboard the vehicle, for each of the planned travel positions in which the use frequency aggregated for the other vehicles is higher than the use frequency aggregated for the specific vehicle.

3. A non-transitory storage medium storing a driving assistance program executable by a processor to perform processing, the processing comprising:

based on use history data of a driving assistance function, including positions at which the driving assistance function has been used at respective vehicles, which is collected from a plurality of vehicles and stored in a memory, and based on position information indicating planned travel positions at which a specific vehicle is going to travel, aggregating use frequencies of the driving assistance function at the planned travel positions of the plurality of vehicles, based on the aggregated use frequencies, outputting information that suggests use of the driving assistance function at the specific vehicle, aggregating the use frequencies of the driving assistance function at the planned travel positions for each of the specific vehicle and other vehicles among the plurality of vehicles which are not the specific vehicle, determining, for each of the planned travel positions, whether a use frequency aggregated for the other vehicles is higher than a use frequency aggregated for the specific vehicle, and in a case in which the use frequency aggregated for the other vehicles is higher than the use frequency aggregated for the specific vehicle, outputting information that suggests use of the driving assistance function at the specific vehicle along with the aggregated use frequencies, toward a user onboard the vehicle, for each of the planned travel positions in which the use frequency aggregated for the other vehicles is higher than the use frequency aggregated for the specific vehicle.

* * * * *